No. 763,383. Patented June 28, 1904.

UNITED STATES PATENT OFFICE.

DAVID FELDHAMER AND NATHAN OELGIESSER, OF NEW YORK, N. Y.

ARTIFICIAL MARBLE.

SPECIFICATION forming part of Letters Patent No. 763,383, dated June 28, 1904.

Application filed April 20, 1904. Serial No. 204,121. (No specimens.)

*To all whom it may concern:*

Be it known that we, DAVID FELDHAMER, a citizen of Austria, and NATHAN OELGIESSER, a citizen of the United States, both residents of New York city, Manhattan, county and State of New York, have invented new and useful Improvements in Artificial Marble, of which the following is a specification.

This invention relates to an artificial marble which is well adapted for the manufacture of molded bath-tubs and for similar articles.

In preparing our artificial marble we proceed as follows: To two parts of slaked lime are added five parts of coal-ashes, two parts of zinc-white, one part of chlorid of zinc, and one-third part of chrome-alum. The ingredients are thoroughly mixed and kneaded without water to form a paste. This paste is molded under pressure into the articles desired. A suitable pigment may be added to the lime while the latter is being slaked.

The molded article is subjected to a heat of 20° to 25° Réaumur for six to eight hours and is then steeped for a few hours into a mixture of one part of tartar, one-fourth part of borax, and ten parts of water. After becoming thus thoroughly saturated the article is dried in the air and may be rubbed down with oil and Venetian soap and may be finally polished.

What we claim is—

1. Artificial marble composed of slaked lime, coal-ashes, zinc-white, chlorid of zinc and chrome-alum, substantially as specified.

2. Artificial marble composed of a mixture of slaked lime, coal-ashes, zinc-white, chlorid of zinc and chrome-alum saturated with a solution of tartar and borax, substantially as specified.

DAVID FELDHAMER.
NATHAN OELGIESSER.

Witnesses:
WILLIAM SCHULZ,
FRANK V. BRIESEN.